(12) United States Patent
Guichard et al.

(10) Patent No.: US 7,724,732 B2
(45) Date of Patent: May 25, 2010

(54) SECURE MULTIPOINT INTERNET PROTOCOL VIRTUAL PRIVATE NETWORKS

(75) Inventors: James N. Guichard, Groton, MA (US); W. Scott Wainner, Potomac Falls, VA (US); John J. Mullooly, Colts Neck, NJ (US); Brian E. Weis, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1332 days.

(21) Appl. No.: 11/072,086

(22) Filed: Mar. 4, 2005

(65) Prior Publication Data

US 2006/0198368 A1  Sep. 7, 2006

(51) Int. Cl.
H04L 12/56 (2006.01)

(52) U.S. Cl. .................. 370/389; 370/466; 380/278; 709/229; 713/160

(58) Field of Classification Search .......... 370/390, 370/392, 466, 389; 709/229, 238; 726/3, 726/8, 10, 14; 705/37; 380/277–286, 44–47; 713/105, 160, 161, 166, 171
See application file for complete search history.

(56) References Cited

U.S. PATENT DOCUMENTS

| | | | | |
|---|---|---|---|---|
| 6,088,451 A * | 7/2000 | He et al. | | 726/8 |
| 6,216,231 B1 * | 4/2001 | Stubblebine | | 726/10 |
| 6,256,741 B1 * | 7/2001 | Stubblebine | | 726/10 |
| 6,434,619 B1 * | 8/2002 | Lim et al. | | 709/229 |
| 6,463,061 B1 * | 10/2002 | Rekhter et al. | | 370/392 |
| 6,629,243 B1 * | 9/2003 | Kleinman et al. | | 713/163 |
| 6,732,181 B2 * | 5/2004 | Lim et al. | | 709/229 |
| 6,751,729 B1 * | 6/2004 | Giniger et al. | | 713/153 |
| 2003/0110288 A1 * | 6/2003 | Ramanujan et al. | | 709/238 |
| 2004/0017796 A1 * | 1/2004 | Lemieux et al. | | 370/349 |
| 2004/0037279 A1 * | 2/2004 | Zelig et al. | | 370/390 |
| 2005/0055306 A1 * | 3/2005 | Miller et al. | | 705/37 |
| 2005/0125490 A1 * | 6/2005 | Ramia | | 709/202 |
| 2005/0213574 A1 * | 9/2005 | Yoshimura et al. | | 370/389 |
| 2006/0002423 A1 * | 1/2006 | Rembert et al. | | 370/466 |
| 2006/0070115 A1 * | 3/2006 | Yamada et al. | | 726/3 |
| 2006/0184999 A1 * | 8/2006 | Guichard et al. | | 726/3 |

* cited by examiner

*Primary Examiner*—Ricky Ngo
*Assistant Examiner*—Gary Mui
(74) *Attorney, Agent, or Firm*—BainwoodHuang

(57) ABSTRACT

A method, apparatus and computer program product for providing secure multipoint Internet Protocol Virtual Private Networks (IPVPNs) is presented. A packet lookup is performed in order to determine a next hop. A VPN label is pushed on the packet, as is an IP tunnel header. Group encryption through the use of DGVPN is further utilized. In such a manner secure connectivity and network partitioning are provided in a single solution.

20 Claims, 5 Drawing Sheets

SECURE MULTIPOINT INTERNET PROTOCOL VIRTUAL PRIVATE NETWORKS

BACKGROUND

Virtual Private Networks (VPNs) provide a partitioning mechanism for isolating data transmitted and received between customer network nodes even though a corresponding physical network supporting propagation of the data is shared by many users. The data transmitted between such network nodes may be encrypted to protect against eavesdropping and tampering by unauthorized parties. Because the physical network is shared, costs of using resources are generally reduced for each of many users. A typical arrangement involves customer edge (CE) routers communicating via the Internet (or shared backbone) between local area networks (LANs), which the respective edge routers protect. The edge routers establish secure, encrypted links between each other to protect the trusted LANs in the VPN.

A physical network such as a service provider network topology, therefore, may include peripherally located provider edge (PE) routers, each of which couples to one or multiple customer edge (CE) routers. The customer edge routers, in turn, may couple to private local area networks (LANs) associated with one or multiple VPNs. To support operation, the service provider's PE routers typically maintain Virtual Routing and Forwarding (VRF) information dictating how to route and forward traffic through the shared physical network to support corresponding VPNs for the different customer departments. Typically, the service provider network selectively couples the local area networks to each other through links created between its PE routers.

Virtual Private Networks (i.e., VPNs) provide a secured means for transmitting and receiving data between network nodes even though a corresponding physical network supporting propagation of the data is shared by many users. The data transmitted between such network nodes (e.g., edge nodes of a service provider network) may or may not be encrypted to protect against eavesdropping and tampering by unauthorized parties.

Two basic networking requirements have become desirable components of next generation IP networks, namely secure connectivity and network partitioning. It would be desirable to combine both requirements within a VPN infrastructure.

Secure connectivity between members of an IPVPN has typically been satisfied through the use of IP security protocol (IPSec) encryption/authentication. IPsec is part of the NetBSD distributions; it provides per-packet authenticity/confidentiality guarantees between peers communicating using IPsec. IPsec is available for both IPv6 and IPv4.

IPsec comprises several separate protocols in order to provide encryption and authentication. One protocol used by IPsec is known as the Authentication Header (AH) protocol, which provides an authenticity guarantee for packets, by attaching a strong crypto checksum to packets. If a packet was received with AH, and the checksum verification operation was successful, and both parties share a secret key, and no other party knows the key, then the packet was originated by the expected peer (i.e., the packet was not generated by an impersonator), and the packet was not modified in transit. Unlike certain other protocols, AH covers the whole packet, from the IP header to the end of the packet.

Another protocol used in IPsec is the Encapsulating Security Payload (ESP) protocol which provides confidentiality guarantee for packets, by encrypting packets with encryption algorithms. If a packet received with ESP is successfully decrypted, both parties share a secret key, and no other party knows the key, then the packet was not modified in transit.

Still another protocol used in IPsec is known as IP payload compression (IPcomp). IPcomp provides a way to compress packets before encryption by ESP.

As described above, AH and ESP require a shared secret key between peers. For communication between distant locations the Internet Key Exchange (IKE), is used to negotiate keys in secrecy.

Network partitioning between different departments within a given Enterprise has been satisfied through the use of technology such as VRF-lite or Carrier's Carrier architecture.

According to one conventional technique, a service network may be extended beyond provider edge nodes to customer edge nodes. For example, a connectivity model may be utilized which enables CE nodes to establish a link between each other for transmission of data messages between corresponding interconnected networks.

SUMMARY

Conventional mechanisms, such as those explained above, suffer from a variety of deficiencies. Many customers are exploring various models for providing "departmental VPNs" within a given Enterprise. These customers are typically a large corporation, university or Federal agency that has multiple internal "departments" or "divisions" that must remain separate. In many cases these departments are co-located in the same premises, thus a single WAN CPE router is desired. Historically, when layer three routing nodes are not required (small campus, no WAN), the departmental separation problem has been solved with very well established layer 2 VLAN technologies. With the added requirements of maintaining the departmental separation across the layer 3 WAN (or any layer 3 routing boundary), layer 2 VLAN models are not sufficient.

As previously explained, the provision of multiple layer 3 VPNs within a non-service provider customer site is typically addressed using VRF-lite functionality. This allows the CPE to hold multiple VRFs, one for each departmental VPN, and each is typically addressed via a specific Ethernet VLAN within the customer premise. No MPLS label imposition is performed at the CPE. A drawback associated with this approach is that a separate interface (logical or physical) is required per-VPN between the CPE and PE-routers.

Another approach is to run an instance of an "overlay" among the CPEs themselves. This is sometimes referred to as "Hierarchical VPNs". Thus the Service Provider provides one L3VPN network for the whole corporation, and just carries the prefixes for CE next-hop addresses as VPN routes exchanged directly between the Enterprise sites; while the CPE provides the departmental separation via CPE based VRFs wherein each department terminates an Ethernet VLAN into a VRF on the CPE. This model is available using Carrier Supporting Carrier (CsC) services today, but this implies Multi-Protocol Label Switching (MPLS) label transport on the PE-CE link. The drawback associated with this mechanism is that this precludes the use of IPSec encryption between the VPN sites unless the traffic is already encrypted within a departmental VPN prior to arriving on the CPE private interface associated with the departmental VPN.

One approach to decoupling the traffic management from the address allocation and routing is to deploy a Virtual Route Forwarding (VRF) entity for each of the internal sub-organizations. Many large enterprises and federal organizations have done this by utilizing VRF-lite technology, available from Cisco Systems, Inc. of San Jose, Calif.

The deployment of a VRF-lite based VPN is a significant task for an organization to undertake; furthermore, it does not maintain the partitioning over the WAN infrastructure unless the enterprise maintains a parallel set of logical interfaces and WAN segments, one for each supported VPN, that maintains the address and routing partition across the entire WAN infrastructure. This approach essentially requires that the customer build multiple WAN networks. This is currently the approach taken where parallel Dynamic Multipoint VPNs (DMVPN) are built with a redundant set of IPSec protection mechanisms applied for each DMVPN partition. This architecture has significant scalability constraints.

An alternative approach is to connect the VRF infrastructure in the enterprise campus using MPLS/VPN services where MPLS is extended down to the CPE device. The enterprise must build or buy an MPLS capable backbone network that enables the MPLS/VPN network partitions to exist. Enterprise customers typically do not want to incur the management, operational, and training costs necessary to build an MPLS infrastructure. Another critical barrier to deployment is that the market has not developed MPLS label encryption devices.

A potential alternative to deploying an MPLS/VPN is to deploy a mesh of point-to-point Generic Routing Encapsulation (GRE) tunnels between the CPE and run Label Distribution Protocol (LDP) through the tunnels. All of the customer CE-routers function as private PE devices and are effectively the penultimate hop routers via the GRE tunnels. Although this model is conceptually easy to implement, it doesn't scale to large numbers as it relies heavily on multiple layers of overlay technology. There are simply too many control planes to synchronize (external IGP, IPSec, GRE, internal IGP, LDP, MP-BGP, and private IGP).

Either of the solutions described above present a significant dilemma for an organization—deploy MPLS/VPN without encryption or deploy IPSec while managing all of the parallel addressing, routing services, and scalability issues for all the departments (no partitioning).

Embodiments of the invention significantly overcome such deficiencies and provide mechanisms and techniques that provide a secure multipoint Internet Protocol Virtual Private Network (IPVPNs).

Multipoint IPVPN is an approach that would not only allow for an IP based solution for departmental VPN services, but it would also easily allow IPSec encryption to work in tandem (since IPSec is not supported for MPLS labeled packets, an IP based option is the only solution). Therefore, Multipoint IPVPN support on CPEs for departmental VPNs, along with the DGVPN solution provides an optimal environment for a scalable encrypted departmental VPN solution. DGVPN is described in detail in co-pending U.S. patent application Ser. No. 10/649,755, filed Aug. 26, 2003, entitled "Method and Apparatus to Distribute Policy Information", as well as co-pending U.S. patent application Ser. No. 10/867,266, filed Jun. 14, 2004 entitled "System and Method for Dynamic Secured Group Communication", the disclosure of which are incorporated by reference in their entirety.

By way of the present invention Multipoint IPVPN and DGVPN technology are combined in order to provide a solution that solves secure connectivity and network partitioning, in a single solution.

In a particular embodiment of a method for providing secure multipoint IPVPNs, the method includes performing a packet lookup in a VRF representing an enterprise department at the CE router to determine a next CE hop and VPN label for the IP destination contained within the incoming packet. The CE next-hop and VPN label information is learned via a mesh of MP-IBGP peering sessions between the CE (or via MP-BGP Route Reflector). Once the remote CE next-hop for the packet is determined, the VPN label that was allocated by that remote CE is pushed onto the packet, along with an IP tunnel header enabling the packet to be IP routable to the remote CE. This provides for connectivity while maintaining the partitioning of distributed departmental VPNs. The provision of an IP tunnel between the CE devices allows application of IPSec protection for the building of a security group using DGVPN technology for multicast and Unicast traffic. The packet is encrypted using a group security association while preserving the IP tunnel header for routing across the WAN infrastructure. In such a manner secure connectivity and network partitioning are provided in a single solution.

Other embodiments include a computer readable medium having computer readable code thereon for providing secure multipoint IPVPNs. The medium includes instructions for performing a packet lookup to determine a next hop. The medium further includes instructions for pushing a VPN label on the packet and for pushing an IP tunnel header on the packet. The medium additionally includes instructions for encrypting and transmitting the packet.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides secure multipoint IPVPNs as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing secure multipoint internet protocol virtual private networks as explained herein. The computer program logic, when executed on at least one processor with a computing system, causes the processor to perform the operations (e.g., the methods) indicated herein as embodiments of the invention.

Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
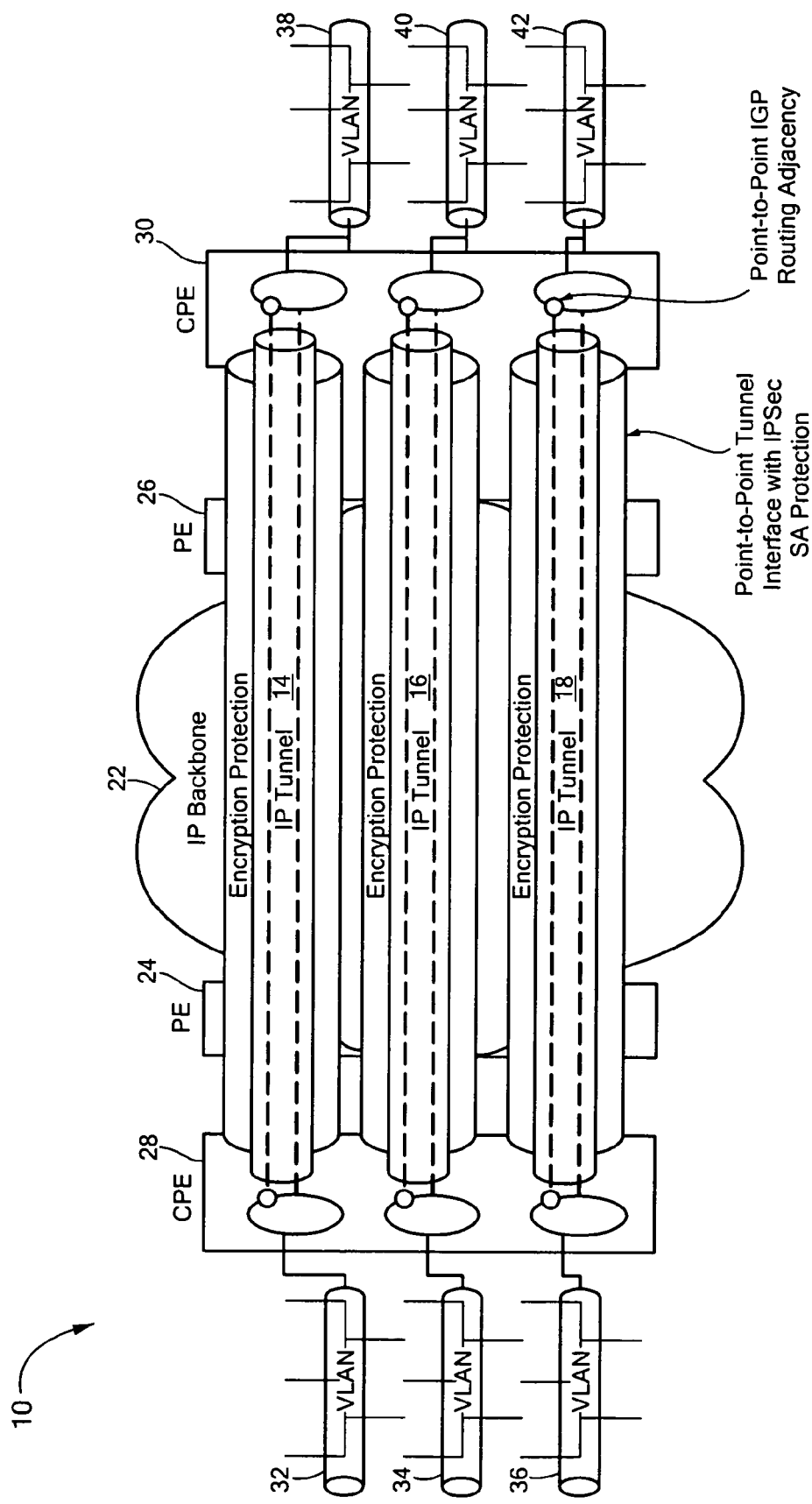
FIG. 1 is a diagram of a prior art environment including a set of parallel logical connections between sets of VRFs.

A secure multipoint IPVPN architecture is used to provide secure communications within a VPN environment. The secure multipoint IPVPN architecture provides security, partitioning, and scalability as well as being service agnostic. The secure multipoint IPVPN architecture is useful when an aggregate of customer traffic (as opposed to a specific application) needs to be encrypted from customer premise to customer premise, the applications that require encryption may include Unicast or multicast capabilities, the encryption needs to be link layer independent; therefore, it must be at layer-3 (i.e. IPSec) or higher, and the enterprise has multiple addressing/routing partitions in a campus environment that are required to be maintained for all traffic as it flows across the WAN and/or provider backbone network. Examples of such a campus environment include a corporation having a corporate VLAN, a quarantine VLAN, and a public VLAN. Another example may be a university having a student VLAN, an administrative VLAN, and a research VLAN.

The enterprise may only have IP routing paths universally available to them between the customer premise equipment; therefore, a label forwarding solution may not be a viable transport methodology (i.e. Carrier's Carrier services may not be available at every customer premises access point). The architecture should also be able to scale to thousands of customer premise locations.

In some environments, security protection is a mandatory requirement for connectivity between all sites of the Enterprise. This may be deployed on a per-site basis, and may include some or all of the sites within the VPN. The security protection extends from CPE to CPE. Each sub-organization at a site of the VPN may elect to belong to a separate security group where an equivalent level of protection is provided for all endpoints within that group. The security mechanism applies to both unicast and multicast packets.

In some of these same environments network partitioning is also a requirement. The enterprise must provide distinct route partitions at each of the CPE sites. The partitioning mechanism allows preservation of the partitions across WAN transport services while IPSec may protect the aggregate set of partitions between CPE. The route partition on the CPE may be extended into the campus environment using Ethernet VLAN partitioning. The partitioning must be sustained across the WAN such that the sub-organizations maintain independent routing and addressing associated with their partition.

Another important criterion for these environments is scalability. The security protection and tunnel partitioning mechanisms should be able to scale to a large network (e.g. more than 1,000 nodes), which accommodates any-to-any unicast and multicast connectivity. The connection state between any two members of a given group must not be based on persistent point-to-point tunnels or pair-wise IPSec Security Associations (SA) since low-end CPE devices cannot cost-effectively sustain thousands of security associations. The association between members should be based on membership of a common group where the tunnel endpoints are members of the group. The group association may apply to both unicast and multicast traffic associated with the tunnel end-points. Packet replication of multicast packet flows should leverage the existing Multicast VPN routing paradigm such that secure multicast groups are maintained and packet replication may occur between the CPE devices in an optimal manner.

These environments should also be service agnostic, wherein the solution is extensible to both managed and unmanaged VPN environments (where the SP either manages the CPE device or does not), and the key server management should also be available as a Service Provider option for deployment. Virtualization of the key server functionality on a centralized Service Provider managed platform may also be desirable.

As described above, multiple requirements are driving the need for secure multipoint IPVPN development. The first of these requirements is that all communication between customer sites must be secured through encryption. Today, many organizations use link layer encryption which restricts them from using newer and lower cost communications facilities. In addition, the link layer encryption devices are performance bound by the link layer technology. These organizations are looking to IP to solve the problem by decoupling the encryption technology from the link layer technology. Customers wish to avoid the introduction of a variety of encryption systems that are dependent upon the link layer media. The choice in most cases is IPSec since it is viable on virtually any link layer technology. However, IPSec has traditionally suffered from multiple scalability constraints. DGVPN has been proposed as a solution to the encryption of this large VPN problem.

Another requirement for these organizations is network partitioning. Typically, within a large enterprise, the IT department is providing a communication service for an internal department, agency, or program. Many times, these sub-organizations operate independently from one another and there is no central management authority for decisions such as IP address allocations, routing protocol selection, and traffic management. The organization is trying to cut costs by aggregating traffic and optimizing the use of expensive WAN resources while they have little control over the traffic flows and content distribution.

Referring to FIG. 1, a prior art environment 10, used for maintaining the partitioning of routing traffic between the CPE 28 and CPE 30 is shown. An IP Backbone 22 is coupled between a first Provider Edge (PE) router 24 and a second PE router 26. Encryption protection (IPsec) is provided for each IP tunnel 14, 16, and 18 that runs between each CPE router 28 and 30. CPE router 28 is coupled between the first PE 24 and attaches a plurality of VLANS 32, 34, and 36 to the CPE via separate VPN logical interfaces. Partitioning within the customer site is achieved through the use of VLANs. CPE router 30 is coupled between the second PE 26 and attaches a plurality of VLANS 38, 40 and 42 to the CPE via separate VPN logical interfaces. Partitioning within the customer site is achieved through the use of VLANs.

A set of parallel logical connections is built between the set of VRF's. Each VRF builds a routing adjacency through a logical connection with the peer VRF on each remote CPE. There are numerous methods for creating the parallel logical connections including the use of Frame Relay PVC's, ATM VPI/VCI, or IP tunnels. The provision for maintaining security between the CPE VRF's may be accommodated by deploying a parallel set of point-to-point IPSec tunnels 14, 16, 18 such that a non-partitioned WAN infrastructure may be used for transport of the protected VPN partitions. The scalability of such a solution is constrained by the requirement to essentially replicate each VPN partition across the WAN infrastructure and maintain the routing adjacencies per VPN partition.

Figure 2:
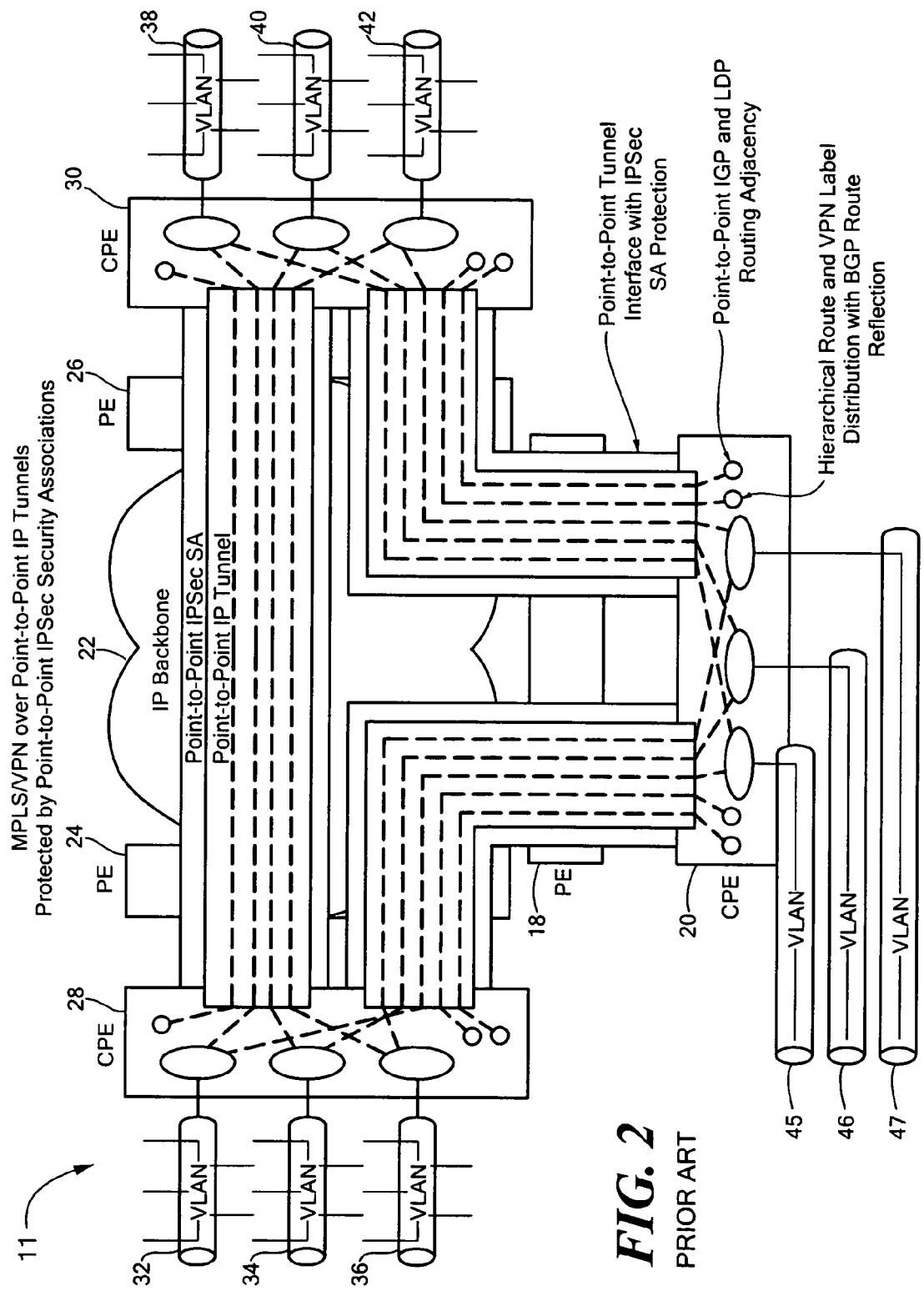
FIG. 2 is a block diagram showing a prior art environment of MPLS/VPN over point-to-point IP tunnels protected by point-to-point IPSec security associations.

Referring now to FIG. 2, a prior art environment 11 showing the partitioning of an enterprise network 10 from end-to-end with the IPSec protection provided on the aggregate set of network partitions is shown. The Environment is similar to that of FIG. 1, but includes a third PE 18 and CPE 20 coupling a plurality of VLANs 45, 46 and 47 to the CPE 28 and to the CPE 30.

This prior art environment 11 uses a method of establishing a point-to-point IP tunnel between the CPE such that IPSec may be used to protect the tunnel. Subsequently, MPLS services are enabled on the IP tunnel such that IGP adjacencies and LDP adjacencies are established between every CPE device.

Figure 3:
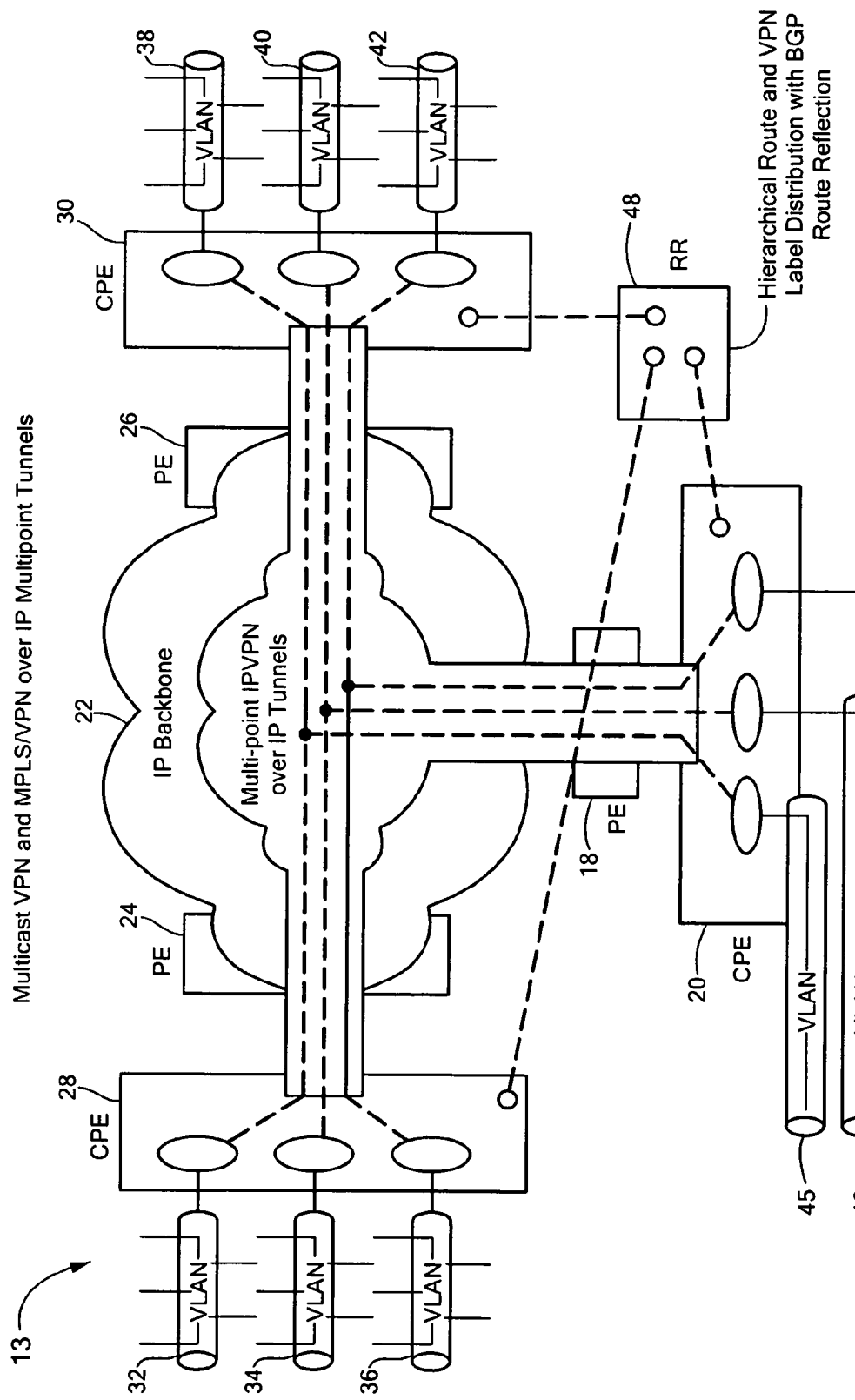
FIG. 3 is a block diagram showing Multicast VPN and MPLS/VPN over IP Multipoint Tunnels.

One alternative is to deploy Multipoint IPVPNs using multi-point IP tunneling, available from Cisco Systems, Inc. of San Jose, California as shown in the environment 13 of FIG. 3. This technology allows the dynamic creation of IP tunnel instances thereby significantly simplifying the configuration of the CPE devices by eliminating the requirement for establishing point-to-point tunnels. The technology allows quick insertion of the MPLS/VPN technology by mitigating the requirement to deploy label switching services in the enterprise WAN, or the need to run multiple logical interfaces to accommodate each of the VPNs. It allows a scalable deployment model where both large and small CPE devices may participate in the routing by leveraging the inherent routing hierarchy of MP-BGP.

The environment 13 includes an IP WAN network 22, including a plurality of WAN IP routers 18, 24, and 26. Also shown is a BGP Route Reflector (RR) 48. Also shown are CPE devices 20, 28 and 30 which are in communication with the WAN IP routers. Each of the CPE devices is shown connected to a respective plurality of Local Area Networks (LANs). CPE 28 is connected to LANs 32, 34 and 36 on the customer side, and to WAN IP router 24 on the provider side. Similarly, CPE 30 is connected to LANs 38, 40 and 42 on the customer side, and to WAN IP router 26 on the provider side. CPE 20 is connected to LANs 45, 46, and 47 on the customer side, and to WAN IP router 18 on the provider side.

In general, customer edge nodes determine a policy for routing data messages based on corresponding locally stored configuration data. For example, a node on a first LAN 32 may attempt to transmit a message to a node associated with a second LAN 45. Prior to transmitting data messages such as data packets generated by a node of the first subnet 10.3.1.0/24, customer edge node 28 checks its corresponding configuration data to determine a policy for forwarding the data messages to a node of subnet 10.2.1.0/24.

Figure 4:
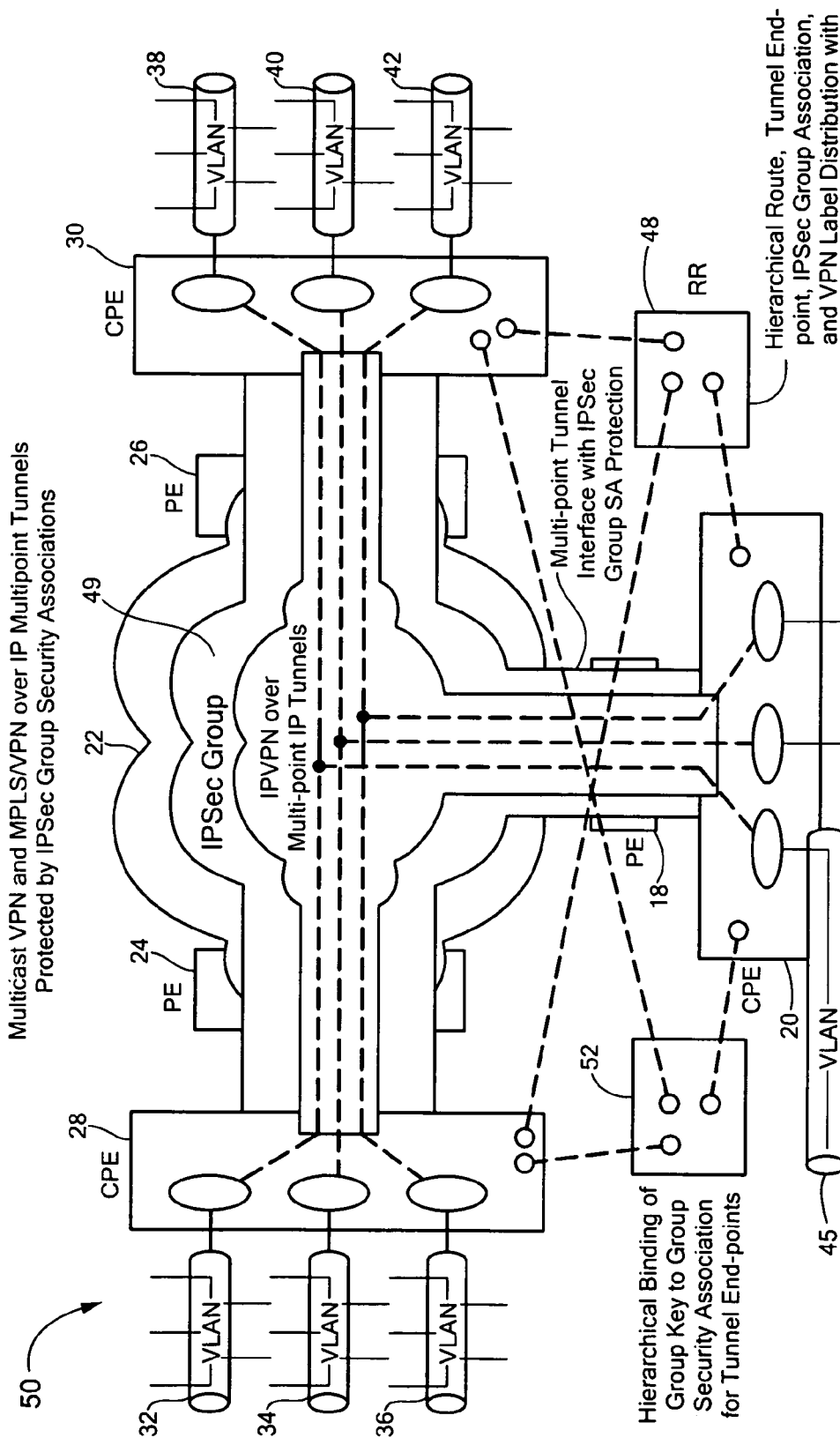
FIG. 4 is a block diagram showing the augmentation of the Multipoint IPVPNs with DGVPN.

Once the Multipoint IPVPN is deployed, the IP tunnels can be augmented with IPSec protection. The development of DGVPN complements Multipoint IPVPNs by facilitating group security between all of the CPE members. A single security group can provide protection for both unicast and multicast traffic while mitigating the requirement for the CPE device to maintain a per-peer encryption state. FIG. 4 shows the augmentation of the Multipoint IPVPNs with DGVPN. Coupling of both of these technologies satisfies both requirements of network partitioning and encryption.

The environment 50 provides for secure communications within a group and includes identifying a plurality of potential recipients as members of a group, in which the group is denoted by a group identifier. A group member, such as a customer edge router, receives security credentials for the group corresponding to the group identifier, and associates the received security credentials with the group identifier (ID) indicative of potential recipients in the group. The association is referenced, such as in a routing lookup, for employing the security credentials via the group identifier for a communication from a member of the group to at least one other member of the group.

The receipt of the security credentials further includes establishing, at a key management server 52, a group key for the group associated with the group identifier, and transmitting the resulting security credentials including the group key to the group members (routers) to enable groupwise usage of the group key by each of the edge routers in the group. The routers receive the security credentials via a unicast or multicast group prefix announcement, in which the announcement is operable for receipt by each member of the group and includes the group ID indicative of the members of the group, optionally the address of a key server having the group key and optionally an authentication method to be employed with respect to the key are included.

Each of the routers in the group employs the security credentials when communicating with the key management server 52 identified in the group prefix announcement and to authenticate themselves with the key management server and the group ID. The authenticated router then receives the key corresponding to the group ID from the key management server. Each of the routers further includes group routing information in a routing table. The group routing information is operable for identifying the subset of the group denoted by a group prefix indicative of an address subrange denoting group members, and for propagating the group prefix and the group ID to other group members. Each of the other group members corresponds to one of the other group prefixes, indicative of an address subrange denoting group members, to provide consistent routing information among the routers. Each of the routers may therefore identify a communication as destined for another group member, and employing the key corresponding to the group for the communication to the other group member.

In particular configurations, the group key corresponding to the group security credentials is operable to transform packets by delivering an encrypted payload to either a single member or a plurality of group members via the key, without reencrypting the payload.

Multipoint IPVPN technology allows the dynamic creation of IP tunnel instances thereby significantly simplifying the configuration of the CPE devices when used for the creation of a VPN service. The IP tunnels are provided through encapsulation of MPLS VPN packets with an L2TPv3 header which is distributed between the edge routers using the BGP "Tunnel" Subsequent Address Family Indicator (SAFI). A typical deployment uses this encapsulation method at the PE-routers. However, this invention suggests moving the encapsulation (and the tunnel SAFI) to the CPE device so that the overhead is distributed away from the PE-routers.

The use of Multipoint IPVPN technology allows quick insertion of the MPLS/VPN technology by mitigating the requirement to deploy label switching services in the enterprise WAN (if standard MPLS VPN is to be run at the CPE routers), or the need to run multiple logical interfaces to accommodate each of the VPNs (if VRF-lite functionality is to be run at the CPE routers). It allows a scalable deployment model where both large and small CPE devices may participate in the routing by leveraging the inherent routing hierarchy of MP-BGP.

In a particular DGVPN arrangement, group members employ a group key operable for multicast and unicast communication, thus avoiding establishing additional unicast keys for each communication between group members. Since the recipient of such a unicast message may not know the source, however, the use of the group key assures the recipient that the sender is a member of the same group. Accordingly, a system which enumerates a set of subranges (subnets) included in a particular group, such as a VPN, and establishing a group key corresponding to the group applies the group key to communications from the group members in the subnet. The group key is associated with the group ID by enumerating the address prefixes corresponding to each of the subnets in the group, and examining outgoing transmissions for destination addresses matching one of the address prefixes corresponding to the group.

A combination of Multipoint IPVPN and DGVPN provides a solution that solves secure VPN connectivity and network partitioning i.e. multiple VPNs, in a single solution. The combination of these technologies resolves the problem of an IT organization having to choose between MPLS/VPN without encryption (for Network partitioning) or IPSec (for encryption/authentication) while managing all of the parallel addressing, routing services, and scalability issues for all the departments as MPLS VPN technology cannot be leveraged. This solution provides the ability to combine two technologies so as to provide a scalable, cost-effective solution for data security and network partitioning.

The Multipoint IPVPN provides a tunnel address set that is completely independent of the sub-organizations addressing and routing. The DGVPN component enables bulk encryption of all data tunneled between any two CPE devices (e.g. 28 and 30) without requiring IPSec policy associated with the sub-organization's addressing and routing protocols. The MP-BGP allows the transparent distribution of routes between the sub-organizations while allowing the IT organization to optimize the aggregate traffic flows and WAN bandwidth. The net effect of such an arrangement is a massively scalable MPLS/VPN network that is protected by IPSec 49, and supports multiple VPNs within a given access. The configuration of the CPE device is simplified through the automated tunnel instance instantiation (through use of the Tunnel SAFI), the dynamic exchange of VPNv4 prefixes associated with private addresses, and the group security paradigm established between all the tunnel end-points. Also shown is the continuum of network partitions when both Multipoint IPVPN and DGVPN are coupled together. Partitioning of VPNs is achieved on CPE 28 through the use of VRFs. A second site partition includes CPE 30 and VLANs 38, 40 and 42. Partitioning of VPNs is achieved on CPE 30 through the use of VRFs.

One advantage of coupling Multipoint IPVPN with DGVPN is that the number of control planes is reduced from the previous 7 (link-layer adjacency, external IGP, IPSec, GRE, IGP, LDP, and MP-BGP) to only 4 (i.e. external/internal IGP, IPSec, MP-BGP, and link-layer adjacencies). The elimination of control planes makes the solution far more reliable. In addition, the chosen control planes have been demonstrated to have massively scalable properties with automated provisioning models. As a result, the solution is very appealing to large enterprises that require the protection of multiple network partitions.

Figure 5:
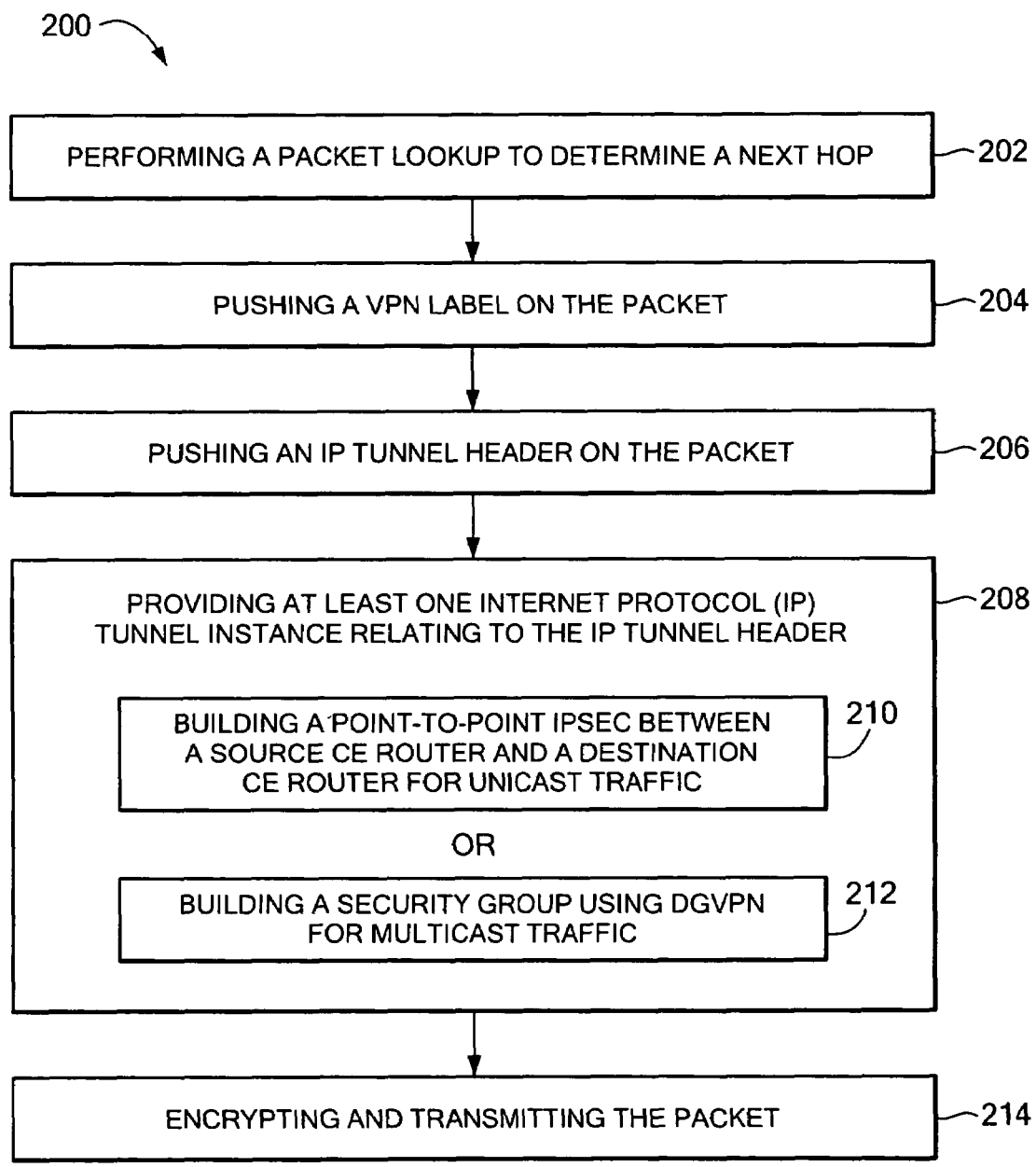
FIG. 5 comprises a flow diagram of a method of providing secure multipoint IPVPNs in accordance with aspects of the present invention.

A flow chart of the presently disclosed method is depicted in FIG. 5. The rectangular elements are herein denoted "processing blocks" and represent computer software instructions or groups of instructions.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 5, a method 200 of providing secure multipoint Internet Protocol Virtual Private Networks (IP-VPNs) is shown. The method begins with processing block 202 wherein a packet lookup is performed in a Virtual Route Forwarding (VRF) table to determine a CE next hop. This determines the remote CE for the packet to be routed to.

In processing block 204 a VPN label is pushed on the packet, and in processing block 206 an IP tunnel header with the destination of the remote CE is pushed on the packet. This is done to identify the VRF on the remote CE and to enable routing of the IP packet via the WAN IP backbone to that remote CE.

As shown in processing block 208, at least one Internet Protocol (IP) tunnel instance relating to the IP tunnel header is provided. This provides an IPSec compliant frame capable of being encrypted while maintaining the partitioning of distributed VPNs.

In processing block 210, the provision of an IP tunnel includes building a point-to-point IPSec between a source CE router and a destination CE router for unicast traffic.

Alternatively, in processing block 212 the provision of an IP tunnel includes building a group security association using DGVPN for multicast and/or Unicast tunneled traffic between any CE source and destination routers that are members of the same group.

As shown in processing block 214, the packet is encrypted and transmitted. In such a manner secure connectivity and network partitioning are provided in a single solution.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as executable code within a memory system.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of routing traffic from a plurality of virtual private networks (VPNs) over a layer 3 backbone network, the method comprising:
   receiving a packet at a local customer edge router, the packet being associated with a particular VPN of the plurality of VPNs;
   performing a packet lookup to determine a remote customer edge router towards which to route the packet;
   encrypting, at the local customer edge router, the packet with encryption parameters associated uniquely with the particular VPN;
   pushing a label on the packet, at the local customer edge router, to identify it as belonging to the particular VPN;
   establishing a dynamic tunnel between the local customer edge router and the remote customer edge router across the layer 3 backbone network;
   after pushing the label on the packet, encapsulating, at the local customer edge router, the labeled packet within a tunneling packet, the tunneling packet having a layer 3 destination address corresponding to a layer 3 destination address of the remote customer edge router; and
   forwarding the tunneling packet across the dynamic tunnel from the local customer edge router towards the remote customer edge router;
   wherein encrypting the packet with encryption parameters associated uniquely with the particular VPN includes:
      sending an identifier of the particular VPN to a remote key management server;
      receiving encryption parameters for secure communication between members of the particular VPN from the remote key management server; and
      encrypting the packet with the received encryption parameters.

2. A method as in claim 1 wherein receiving the packet at the local customer edge router includes receiving the packet from a particular virtual local area network (VLAN) of a plurality of VLANs connected to the local customer edge router, the particular VLAN being associated with the particular VPN.

3. A method as in claim 1 wherein the VPN is a dynamic group VPN.

4. A method as in claim 1 wherein:
   each VPN of the plurality of VPNs includes members at the local customer edge router and at a plurality of remote customer edge routers; and
   receiving encryption parameters for secure communication between members of the particular VPN from the remote key management server includes receiving an encryption key which allows the local customer edge router to securely communicate with all members of the particular VPN regardless of which remote customer edge router that particular VPN member is associated with.

5. A method as in claim 1 wherein receiving encryption parameters for secure communication between members of the particular VPN from the remote key management server includes:
   receiving a group key, the group key being capable of being used to:
      decrypt unicast communications received from any member of that VPN; and
      encrypt unicast communications to be transmitted to any member of that VPN, each member of that VPN sharing the group key to allow for decryption of the communications.

6. A computer program product comprising a computer-readable medium having computer readable instructions recorded thereon for routing traffic from a plurality of virtual private networks (VPNs) over a layer 3 backbone network, the computer readable instructions being operative, when performed by a computerized device, to cause the computerized device to:
   receive a packet, the packet being associated with a particular VPN of the plurality of VPNs;
   perform a packet lookup to determine a remote customer edge router towards which to route the packet;
   encrypt the packet with encryption parameters associated uniquely with the particular VPN;
   push a label on the packet to identify it as belonging to the particular VPN;
   establish a dynamic tunnel between the computerized device and the remote customer edge router across the layer 3 backbone network;
   after pushing the label on the packet, encapsulate the labeled packet within a tunneling packet, the tunneling packet having a layer 3 destination address corresponding to a layer 3 destination address of the remote customer edge router; and
   forward the tunneling packet across the dynamic tunnel towards the remote customer edge router;
   wherein the computer readable instructions are operative to, when encrypting the packet with encryption parameters associated uniquely with the particular VPN, cause the computerized device to:
      send an identifier of the particular VPN to a remote key management server;
      receive encryption parameters for secure communication between members of the particular VPN from the remote key management server; and
      encrypt the packet with the received encryption parameters.

7. A computer program product as in claim 6 wherein:
each VPN of the plurality of VPNs includes members at the local customer edge router and at a plurality of remote customer edge routers; and
the computer readable instructions are operative to, when receiving encryption parameters for secure communication between members of the particular VPN from the remote key management server, cause the computerized device to receive an encryption key which allows the local customer edge router to securely communicate with all members of the particular VPN regardless of which remote customer edge router that particular VPN member is associated with.

8. A computer program product as in claim 6 wherein the computer readable instructions are operative to, when receiving encryption parameters for secure communication between members of the particular VPN from the remote key management server, cause the computerized device to:
receive a group key, the group key being capable of being used to:
decrypt unicast communications received from any member of that VPN; and
encrypt unicast communications to be transmitted to any member of that VPN, each member of that VPN sharing the group key to allow for decryption of the communications.

9. A computer program product as in claim 6 wherein the computer readable instructions are operative to, when receiving the packet, cause the computerized device to:
receive the packet from a particular virtual local area network (VLAN) of a plurality of VLANs connected to the computerized device, the particular VLAN being associated with the particular VPN.

10. A computer program product as in claim 6 wherein the received packet is a layer 3 packet.

11. A computerized device comprising:
a memory;
a processor;
a communications interface;
an interconnection mechanism coupling the memory, the processor and the communications interface; and
wherein the memory is encoded with an application for routing traffic from a plurality of virtual private networks (VPN) over a layer 3 backbone network, that when performed on the processor, provides a process for processing information, the process causing the computerized device to perform the operations of:
receiving a packet, the packet being associated with a particular VPN of the plurality of VPNs;
performing a packet lookup to determine a remote customer edge router towards which to route the packet;
encrypting the packet with encryption parameters associated uniquely with the particular VPN;
pushing a label on the packet to identify it as belonging to the particular VPN;
establishing a dynamic tunnel between the computerized device and the remote customer edge router across the layer 3 backbone network;
after pushing the label on the packet, encapsulating the labeled packet within a tunneling packet, the tunneling packet having a layer 3 destination address corresponding to a layer 3 destination address of the remote customer edge router; and
forwarding the tunneling packet across the dynamic tunnel towards the remote customer edge router;
wherein the process, when encrypting the packet with encryption parameters associated uniquely with the particular VPN, causes the computerized device to perform the operations of:
sending an identifier of the particular VPN to a remote key management server;
receiving encryption parameters for secure communication between members of the particular VPN from the remote key management server; and
encrypting the packet with the received encryption parameters.

12. A computerized device as in claim 11 wherein:
each VPN of the plurality of VPNs includes members at the local customer edge router and at a plurality of remote customer edge routers; and
the process, when receiving encryption parameters for secure communication between members of the particular VPN from the remote key management server, causes the computerized device to perform the operation of receiving an encryption key which allows the local customer edge router to securely communicate with all members of the particular VPN regardless of which remote customer edge router that particular VPN member is associated with.

13. A computerized device as in claim 11 wherein the process, when receiving encryption parameters for secure communication between members of the particular VPN from the remote key management server, causes the computerized device to perform the operation of:
receiving a group key, the group key being capable of being used to:
decrypt unicast communications received from any member of that VPN; and
encrypt unicast communications to be transmitted to any member of that VPN, each member of that VPN sharing the group key to allow for decryption of the communications.

14. A computerized device as in claim 11 wherein the process, when receiving the packet, causes the computerized device to perform the operation of:
receiving the packet from a particular virtual local area network (VLAN) of a plurality of VLANs connected to the computerized device, the particular VLAN being associated with the particular VPN.

15. A computerized device as in claim 11 wherein the received packet is a layer 3 packet.

16. A system for routing traffic from a plurality of virtual private networks (VPN) over a layer 3 backbone network, the system comprising:
means for receiving a packet at a local customer edge router, the packet being associated with a particular VPN of the plurality of VPNs;
means for performing a packet lookup to determine a remote customer edge router towards which to route the packet;
means for encrypting the packet with encryption parameters associated uniquely with the particular VPN;
means for pushing a label on the packet to identify it as belonging to the particular VPN;
means for establishing a dynamic tunnel between the local customer edge router and the remote customer edge router across the layer 3 backbone network;
means for, after pushing the label on the packet, encapsulating, at the local customer edge router, the labeled packet within a tunneling packet, the tunneling packet having a layer 3 destination address corresponding to a layer 3 destination address of the remote customer edge router; and means for forwarding the tunneling packet across the dynamic tunnel towards the remote customer edge router;

wherein the means for encrypting the packet with encryption parameters associated uniquely with the particular VPN include means for:

sending an identifier of the particular VPN to a remote key management server;

receiving encryption parameters for secure communication between members of the particular VPN from the remote key management server; and encrypting the packet with the received encryption parameters.

17. A system as in claim 16 wherein:

each VPN of the plurality of VPNs includes members at the local customer edge router and at a plurality of remote customer edge routers; and the means for receiving encryption parameters for secure communication between members of the particular VPN from the remote key management server, include means for receiving an encryption key which allows the local customer edge router to securely communicate with all members of the particular VPN regardless of which remote customer edge router that particular VPN member is associated with.

18. A system as in claim 16 wherein the means for receiving encryption parameters for secure communication between members of the particular VPN from the remote key management server include means for:

receiving a group key, the group key being capable of being used to:

decrypt unicast communications received from any member of that VPN; and encrypt unicast communications to be transmitted to any member of that VPN, each member of that VPN sharing the group key to allow for decryption of the communications.

19. A system as in claim 16 wherein the means for receiving the packet at the local customer edge router include means for:

receiving the packet from a particular virtual local area network (VLAN) of a plurality of VLANs connected to the local customer edge router, the particular VLAN being associated with the particular VPN.

20. A system as in claim 16 wherein the packet received at the local customer edge router is a layer 3 packet.

* * * * *